US011087009B2

(12) United States Patent
Reed et al.

(10) Patent No.: US 11,087,009 B2
(45) Date of Patent: Aug. 10, 2021

(54) AUTHORIZATION-BASED MESSAGING

(71) Applicant: International Business Machines Corporation, Armonk, NY (US)

(72) Inventors: David C. Reed, Tucson, AZ (US); Gregory E. McBride, Vail, AZ (US); Kenneth J. Owin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 16/023,032

(22) Filed: Jun. 29, 2018

(65) Prior Publication Data

US 2020/0004975 A1    Jan. 2, 2020

(51) Int. Cl.
    *G06F 21/00*     (2013.01)
    *G06F 21/62*     (2013.01)
    *G06F 21/44*     (2013.01)
    *G06F 9/54*     (2006.01)

(52) U.S. Cl.
    CPC .............. *G06F 21/62* (2013.01); *G06F 9/542* (2013.01); *G06F 21/44* (2013.01)

(58) Field of Classification Search
    CPC ........... G06F 21/62; G06F 9/542; G06F 21/44
    See application file for complete search history.

(56) References Cited

U.S. PATENT DOCUMENTS

| | | | |
|---|---|---|---|
| 6,587,836 B1 | 7/2003 | Ahlberg et al. | |
| 8,112,103 B2 | 2/2012 | Yeh et al. | |
| 9,286,482 B1* | 3/2016 | Dumont | G06F 21/32 |
| 9,736,168 B2 | 8/2017 | Cadden et al. | |
| 10,726,143 B1* | 7/2020 | Ledet | H04L 9/3226 |
| 2004/0095237 A1* | 5/2004 | Chen | G06F 11/0748 340/506 |
| 2006/0041625 A1* | 2/2006 | Chen | G06Q 10/107 709/206 |
| 2008/0126110 A1* | 5/2008 | Haeberle | G06F 9/542 717/168 |
| 2008/0133673 A1* | 6/2008 | Abdelhadi | G06Q 10/107 709/206 |

(Continued)

OTHER PUBLICATIONS

Ip.com, Anonymously, "Software Error Detection and Remediation Technique," ip.com No. IPCOM000225124D, Jan. 24, 2013.

(Continued)

*Primary Examiner* — Brandon S Hoffman
*Assistant Examiner* — William A Corum, Jr.
(74) *Attorney, Agent, or Firm* — Nelson and Nelson; Daniel P. Nelson

(57) ABSTRACT

A method for providing different message information to users based on authorization level is disclosed. In one embodiment, such a method includes detecting an event, such as an error or abnormal termination, in a hardware or software product. The method generates a message in association with the event and determines an authorization level of a user intended to receive the message. In the event the user is associated with a first authorization level, the method includes first content in the message. In the event the user is associated with a second authorization level, the method includes second content in the message. The second content may be more comprehensive than the first content. A corresponding system and computer program product are also disclosed.

17 Claims, 6 Drawing Sheets

(56) References Cited

U.S. PATENT DOCUMENTS

| | | | | |
|---|---|---|---|---|
| 2009/0319623 | A1* | 12/2009 | Srinivasan | G06Q 10/107 |
| | | | | 709/206 |
| 2013/0330704 | A1* | 12/2013 | Creamer | G09B 7/00 |
| | | | | 434/362 |
| 2018/0082069 | A1* | 3/2018 | Cunico | H04L 63/0227 |
| 2018/0102952 | A1* | 4/2018 | Gopalakrishnan | H04L 43/08 |
| 2018/0107570 | A1* | 4/2018 | Hardy | G06F 11/16 |

OTHER PUBLICATIONS

Ip.com, Palanisamy, et al., "A Method for Providing to a Sender of Email Information Associated with an Error Code Generated due to Delivery Failure of the Email," ip.com No. IPCOM000237377D, Jun. 16, 2014.

Ip.com, Anonymously, "Method and System for Retaining Confidentiality of Diagnostic Code," ip.com No. IPCOM000225227D, Jan. 31, 2013.

IBM, "Messages Guide," Security zSecure, Version 2.1.1, Mar. 2015.

\* cited by examiner

AUTHORIZATION-BASED MESSAGING

BACKGROUND

Field of the Invention

This invention relates to systems and methods for providing different messaging and diagnostic information to users based on different authorization levels.

Background of the Invention

Today, most hardware and software products have confidential information association therewith that describes how the products work and/or how to interface with the products. This information is typically not externalized in product messages. Vendors or developers of such products may provide documentation containing confidential information to users of the products in accordance with some agreed-upon payment or licensing arrangement. This confidential information may enable users to make their own products compatible with a particular product or enable the users to build products on top of a particular product. In other cases, the confidential information may enable users to access special features or functions of the product that may not otherwise be known or available to other general users of the product.

If products provide externalized information such as diagnostic information to a user, these products typically only provide one level or type of diagnostic information, regardless of the user's access rights or authorization level. In some cases, this information is not sufficient to enable the user to understand a problem or issue associated with the product. In such cases, the user may need to obtain the services of a more experienced or sophisticated user or technician to interpret the information. In other cases, vendors or developers of such products may intentionally withhold information from inexperienced or unlicensed users to prevent the users from attempting to fix or diagnose the problem themselves, and thereby potentially causing additional problems or making the problem worse.

In view of the foregoing, what are needed are systems and methods to provide different levels of messaging and diagnostic information to different categories of users. Ideally, such systems and methods will enable vendors or developers of hardware and software products to tailor messaging and diagnostic information to users based on their experience and/or authorization level.

SUMMARY

The invention has been developed in response to the present state of the art and, in particular, in response to the problems and needs in the art that have not yet been fully solved by currently available systems and methods. Accordingly, embodiments of the invention have been developed to provide different message information to users based on authorization level. The features and advantages of the invention will become more fully apparent from the following description and appended claims, or may be learned by practice of the invention as set forth hereinafter.

Consistent with the foregoing, a method for providing different message information to users based on authorization level is disclosed. In one embodiment, such a method includes detecting an event, such as an error or abnormal termination, in a hardware or software product. The method generates a message in association with the event and determines an authorization level of a user intended to receive the message. In the event the user is associated with a first authorization level, the method includes first content in the message. In the event the user is associated with a second authorization level, the method includes second content in the message. The second content may be more comprehensive than the first content. A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
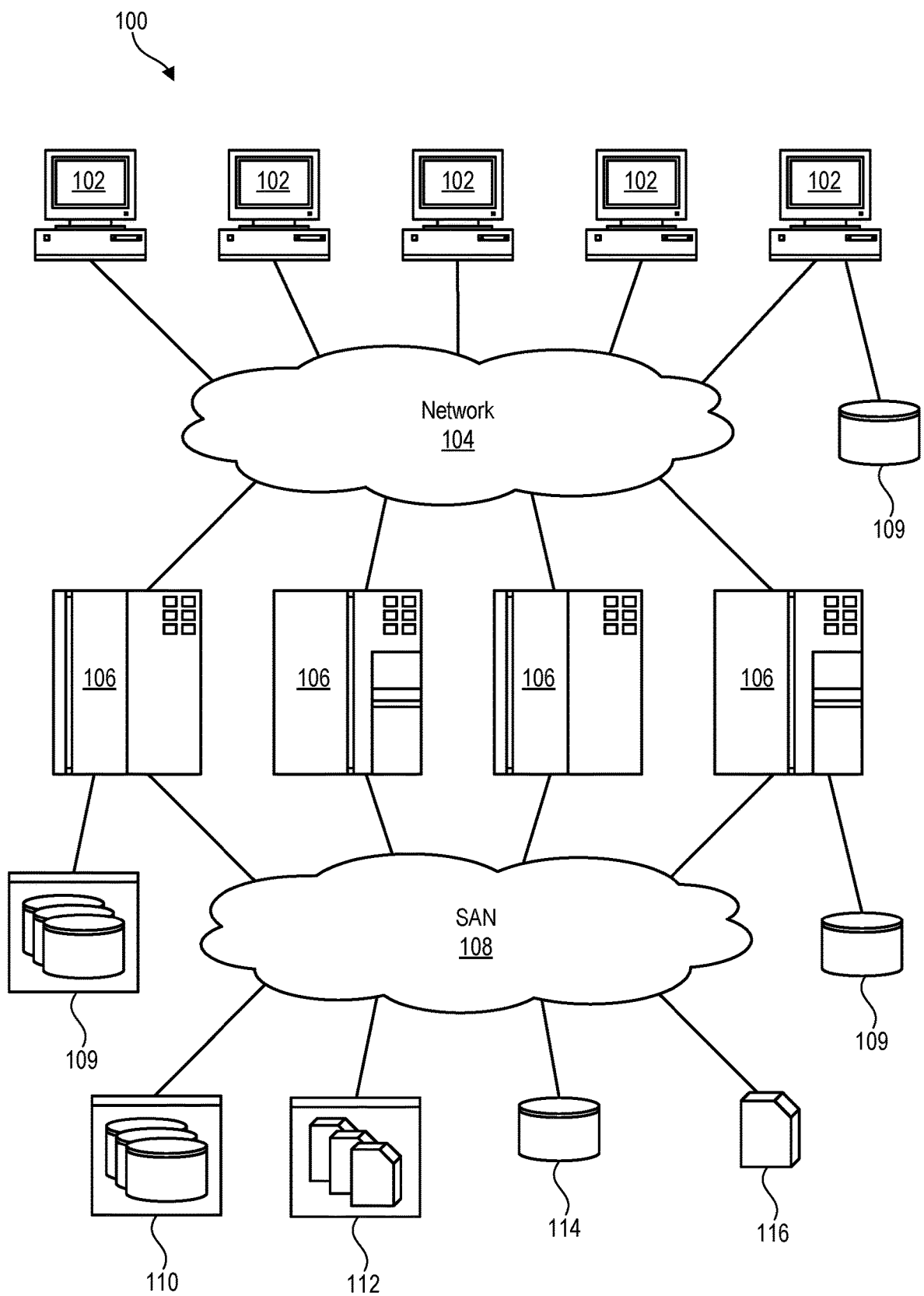
FIG. 1 is a high-level block diagram showing one example of a network environment in which systems and methods in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented only by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays or individual hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
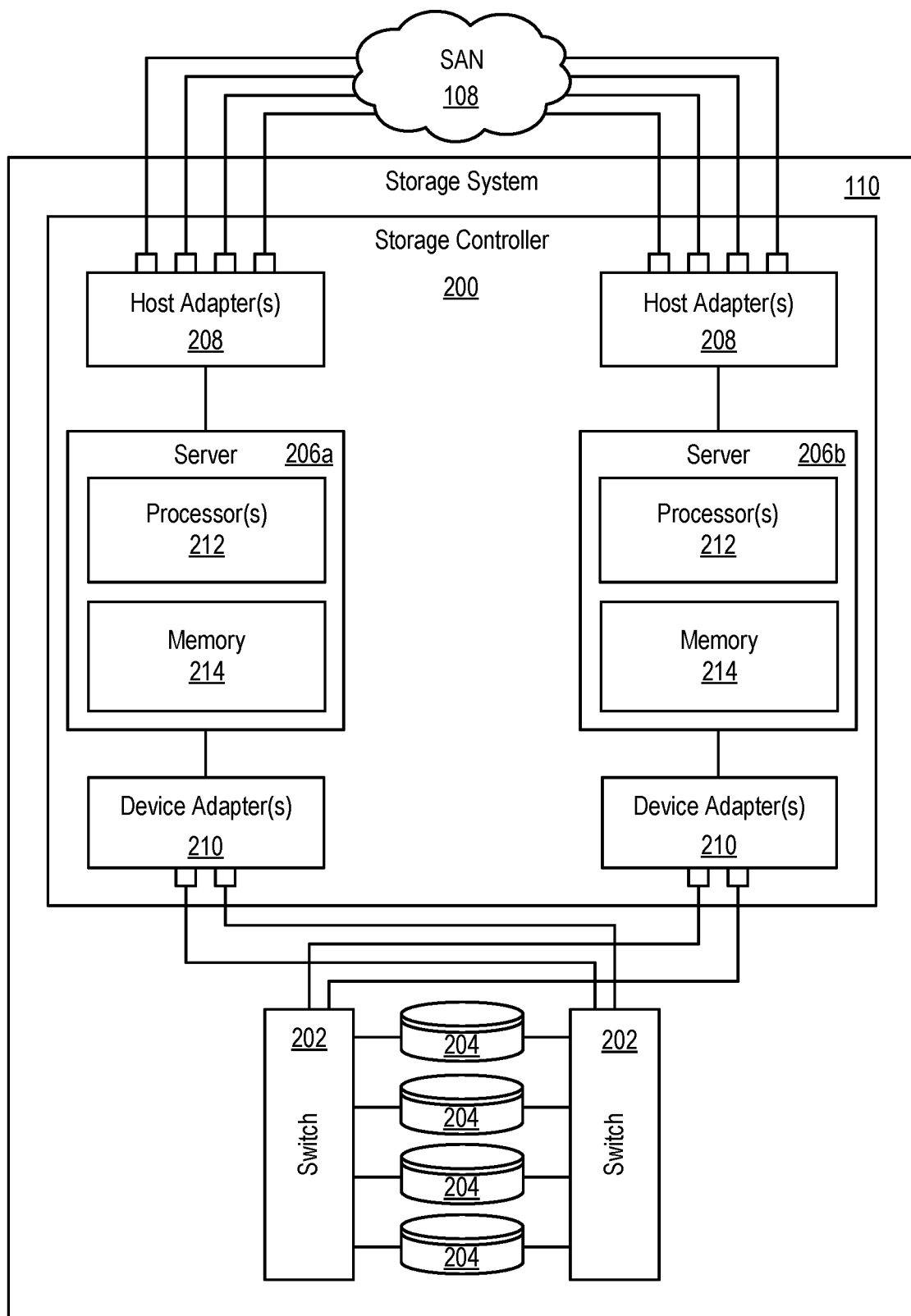
FIG. 2 is a high-level block diagram showing one example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
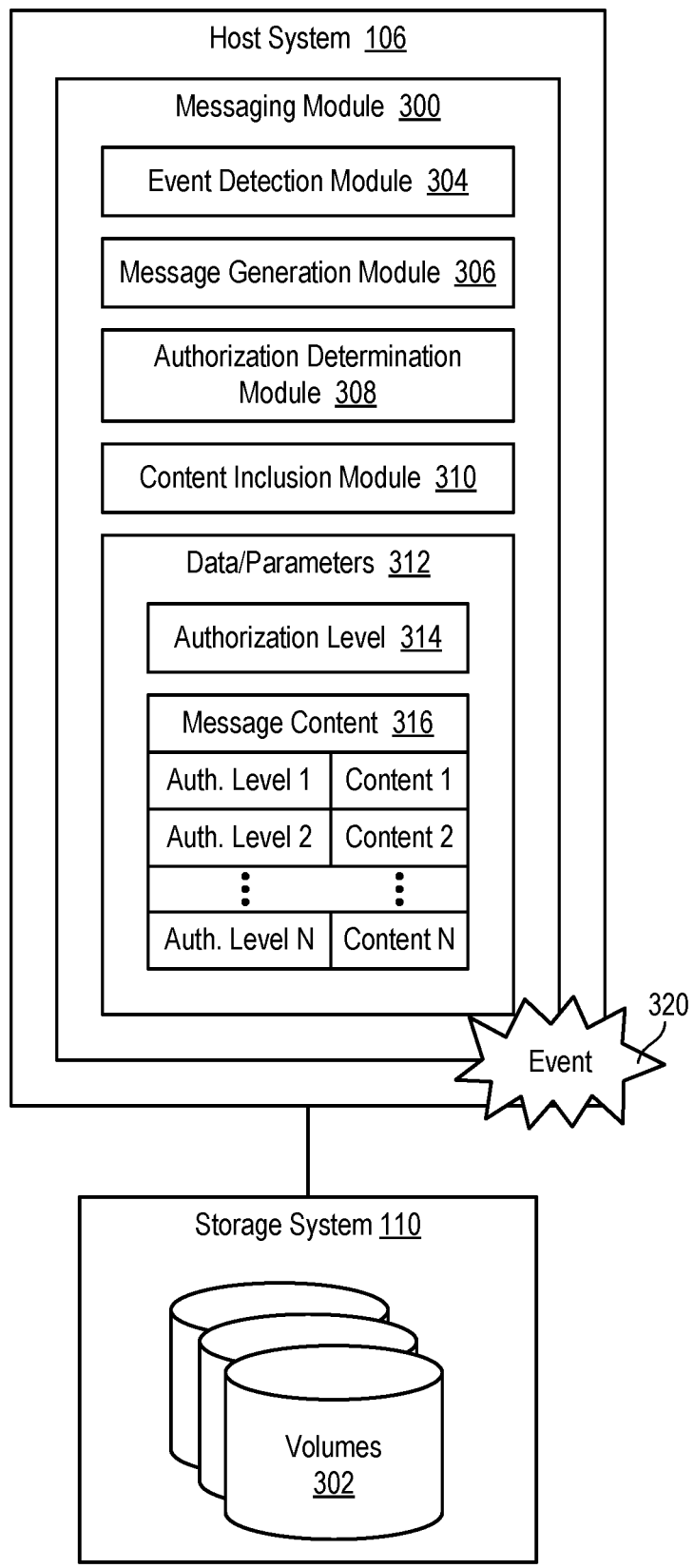
FIG. 3 is a high-level block diagram showing a messaging module to provide different message information to users based on authorization level.

Referring to FIG. 3, as previously mentioned, confidential information exists for most hardware and software products that describes how the products work and/or how to interface with the products. This information is typically not externalized in product messages that are provided to users or stored in logs. In certain cases, confidential information may be provided to users of the products in accordance with some agreed-upon payment or licensing arrangement. This confidential information is often helpful to make products compatible with one another or enable developers to build a product on top of another product. In other cases, confidential information may enable users to access special features or functions of the product that may not otherwise be known or available to other general users.

If products do externalize certain information, these products typically only provide one level information, regardless of a user's access rights or authorization. In some cases, this information is not sufficient to enable the user to understand a problem or issue associated with the product. In such cases, the user may need to obtain the services of a more experienced or sophisticated user or technician to interpret the information and/or determine appropriate corrective action. In other cases, vendors or developers of such products may intentionally withhold information from inexperienced or unlicensed users to prevent the users from attempting to fix or diagnose the problem themselves, and thereby potentially causing additional problems or making the problem worse.

In view of the foregoing, systems and methods are needed to provide different levels of messaging and diagnostic information to different categories of users. Ideally, such systems and methods will enable vendors or developers of hardware and software products to tailor messaging and diagnostic information to users based on their experience and/or authorization levels.

In order to provide the features and benefits set forth above, in certain embodiments, a messaging module 300 may be provided in a computing system such as a host system 106. This messaging module 300 may be configured to provide different message information to users based on their authorization levels. The messaging module 300 may be implemented in software, hardware, firmware, or a combination thereof.

As shown, the messaging module 300 includes various sub-modules 304-310, data 312, and parameters 312 to provide various features and functions. These sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the sub-modules include an event detection module 304, message generation module 306, authorization determination module 308, and content inclusion module 310. The authorization determination module 308 may, in certain embodiments, reference an authorization level parameter 314 and the content inclusion module 310 may reference message content 316. The message content 316 may be embodied as a table or other data structure (protected by encryption or other means) that includes authorization levels and corresponding content. The content may vary in detail and comprehensiveness for each authorization level.

The event detection module 304 may monitor for different types of events 320, such as errors, abnormal terminations (abends), or other conditions, that occur on the host system 106. These may be events 320 that occur on the host system 106 itself or in another system, such as a storage system 110, that are coupled to or communicate with the host system 106. For example, the error may be an I/O error that occurs when performing I/O to volumes 302 of the storage system 110. Other types of events 320 are possible and within the scope of the invention. In certain cases, the events 320 require some type of corrective action from a user.

When an event 320 is detected by the event detection module 304, the message generation module 306 may generate a message that includes information about the event 320. This may be information that is presented to a user, such as information in a pop-up window, or information that is stored in a system log or other record. When a message is generated, the authorization determination module 308 may determine an authorization level 314 associated with a user (e.g., owner, licensee, system administrator, etc.) of the host system 106. In certain embodiments, this is accomplished by reading the authorization level parameter 314. In certain embodiments, the authorization level parameter 314 is set when a user enters a product key or code that authorizes a user to utilize and access a feature set of the product. In other embodiments, the authorization level 314 is set by a technician or field agent.

Once the authorization determination module 308 determines the authorization level 314, the content inclusion module 310 may determine content to include in the message. In certain embodiments, this may be accomplished by accessing a table or data structure that contains message content 316. This content 316 may include different levels of detail and comprehensiveness for each authorization level 314. For example, "Content 1" may be a standard message set that includes esoteric return codes that require a technician or support center to interpret them, whereas "Content 2" may be an extended message set that includes the same return codes with a detailed explanation of what the return codes mean, and potentially a list of corrective actions that may be taken in response to the return codes.

Figure 4:
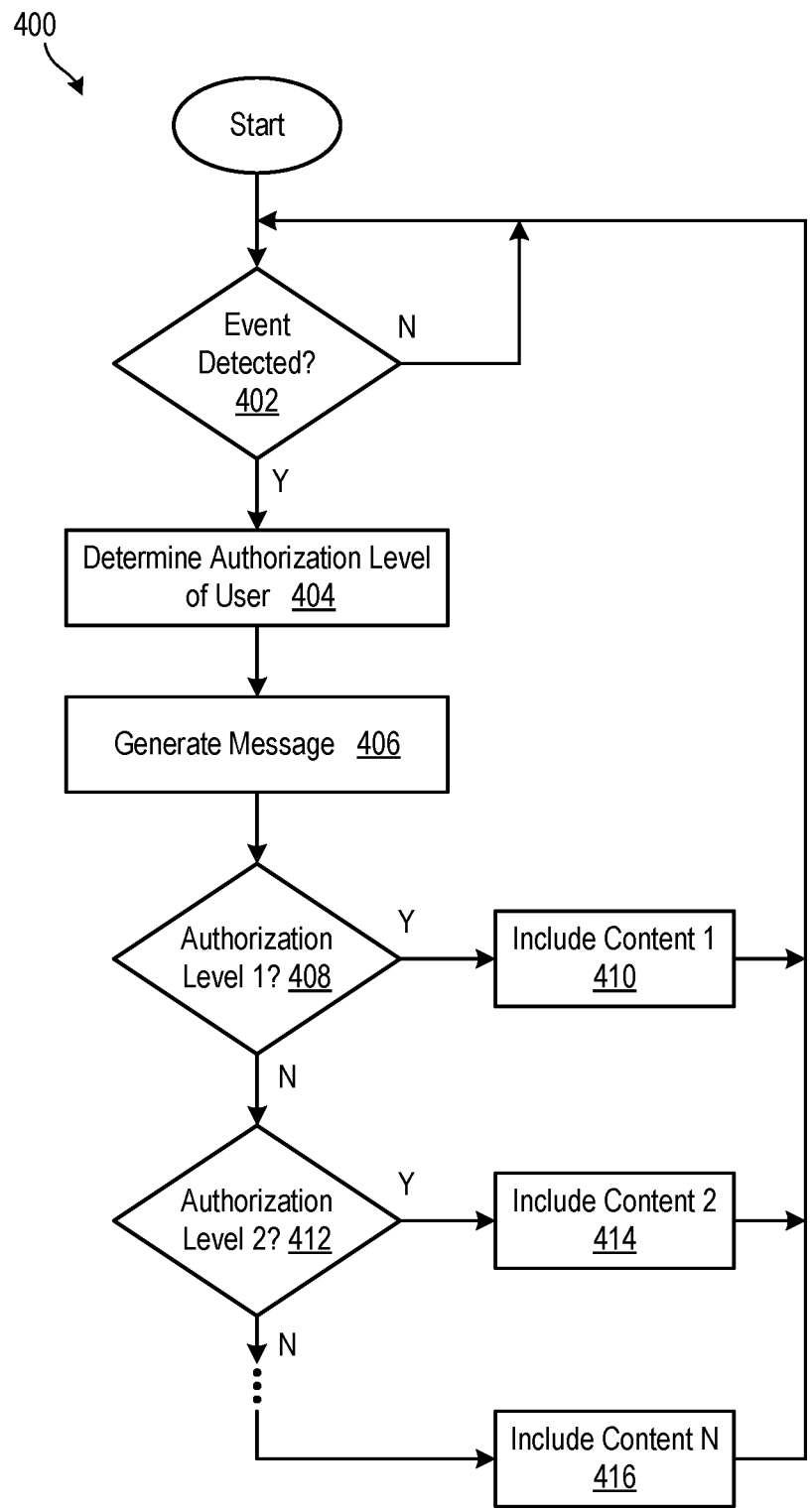
FIG. 4 is a process flow diagram showing a generalized method for providing different message information to users based on authorization level.

Referring to FIG. 4, a generalized method 400 for providing message information to users based on authorization level is illustrated. As shown, the method 400 initially determines 402 whether an event 320, such as an error, has occurred in a hardware or software product. This may be an event 320 that is normally accompanied by a message in the hardware or software product. The method 400 further determines 404 an authorization level 314 associated with a user of the hardware or software product. This may occur at the time of the event 320 or at some time preceding the event 320, such as when a user registers the product, inputs a key code into the product, or has the authorization level 314 set by a technician or field agent. The authorization level 314 maybe set at the software or hardware device level.

The method 400 generates 406 a message in association with the event 320. In this example, assume that the product includes Authorization Levels 1 through N with associated Contents 1 through N. If the authorization level 314 is Authorization Level 1, the method 400 includes 410 Content 1 in the message. If the authorization level 314 is Authorization Level 2, the method 400 includes 414 Content 2 in the message. Similarly, if the authorization level 314 is Authorization Level N, the method 400 includes 416 Content N in the message. This process may be performed for any number of authorization levels 314 and associated content.

Figure 5:
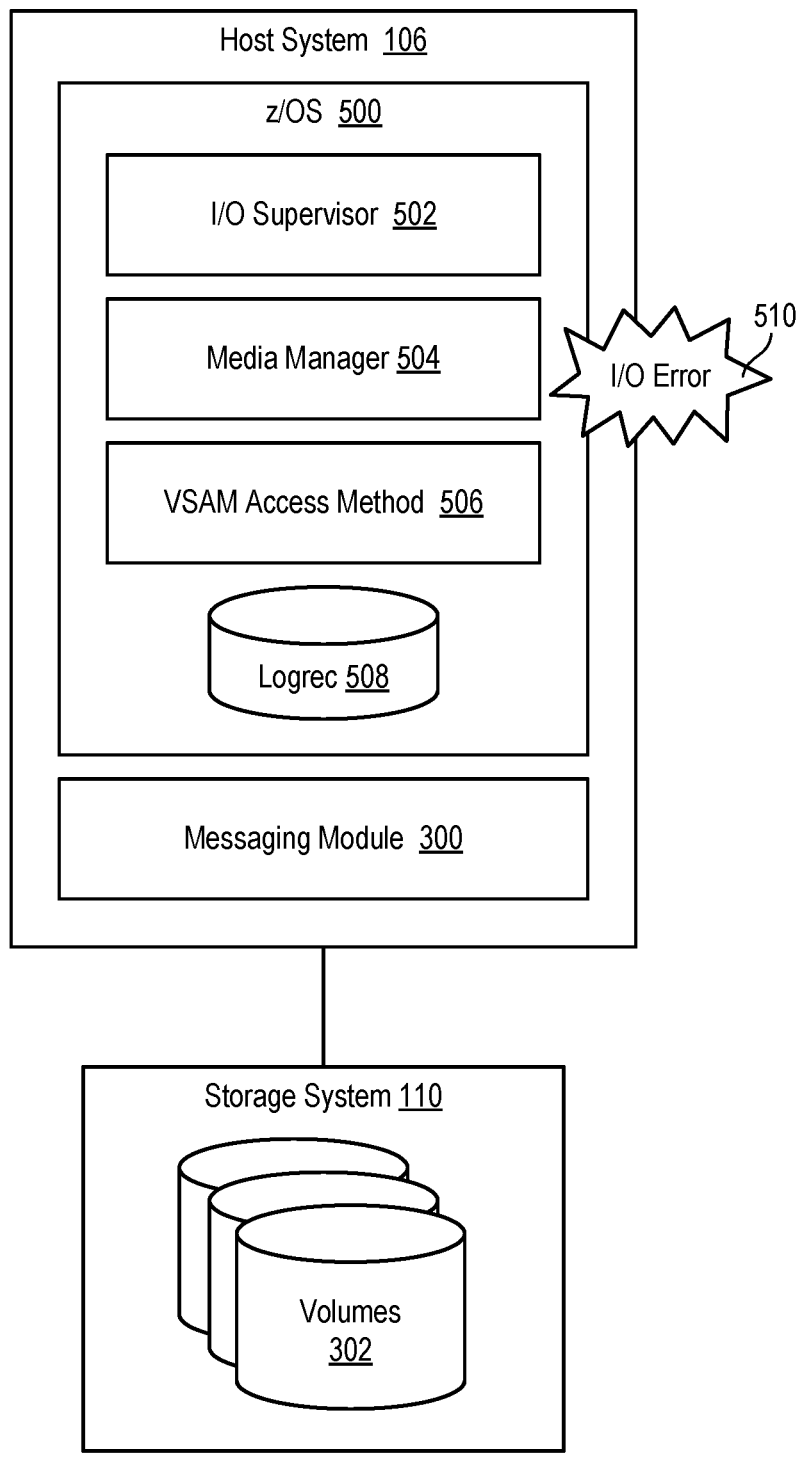
FIG. 5 is a high-level block diagram showing a real-world example and implementation of a messaging module configured to provide different message information to users based on authorization level.

FIG. 5 provides one exemplary real-world application of a messaging module 300 in accordance with the invention. As shown, in certain embodiments, an operating system such as z/OS 500 may execute on a host system 106. The z/OS operating system 500 may include various modules or components to perform I/O. For example, z/OS may include an Input/Output Supervisor component 502 that handles I/O requests and I/O interruptions within the z/OS environment. The z/OS operating system 500 may further include various access methods to enable access to data on disk drives or other storage devices. For example, the Virtual Storage Access Method (VSAM) access method 506 is an access method that is configured to access VSAM data sets on direct access storage devices (DASD) such as disk drives. A Media Manager component 504 may provide an interface between the VSAM access method 506 and the I/O Supervisor component 502.

In the z/OS environment, the Media Manager component 504 is an I/O driver with access methods that may be faster and more efficient than other access methods within z/OS. However, instructions for using the Media Manager component 504 may not be externally documented and may require a license or other arrangement to authorize use of the component 504. Once authorized, users may receive documentation that details the application programming interface for the Media Manager component 504, including what parameters need to be passed to the component 504 and instructions for calling the component 504.

In certain embodiments, a messaging module 300 in accordance with the invention may tailor messages generated by the Media Manager component 504 in accordance with a user's authorization level 314. As an example, whenever a software abend or I/O error 510 is encountered by the Media Manager component 504, the component 504 may write an ICYTRACE record with Channel Command Word (CCW) and sense data to a logrec repository 508 (i.e., the z/OS error log). This information may be esoteric and difficult to understand for the untrained or inexperienced user. If a user is not authorized to utilize the Media Manager component 504 or the user has a lower authorization level 314, the messaging module 300 may provide no explanation of the CCW or sense data to assist a user in understanding the meaning of the trace record.

However, if the user is authorized to use the Media Manager component 504 or has a higher level of authorization, the messaging module 300 may provide more detailed information such as the meaning of the CCW and sense data. The trace record may break down the CCW that actually failed showing the precise parameter with the error, the meaning of the error, and suggested corrective action. In some cases additional return codes may be provided, along with the common return codes. These additional return codes may provide greater detail regarding the nature of the error 510.

For errors 510 associated with the storage system 110, a product key or technician may be used to authorize a more detailed message set. The host system 106 may verify that the storage system 110 is entitled to the more detailed message set. If the storage system 110 is entitled, the host system 106 may access an encrypted look up table or other data structure where the more detailed message set is stored for the CCW and sense data. This more detailed information may then be passed on via external messages or stored in the logrec error log 508.

Figure 6:
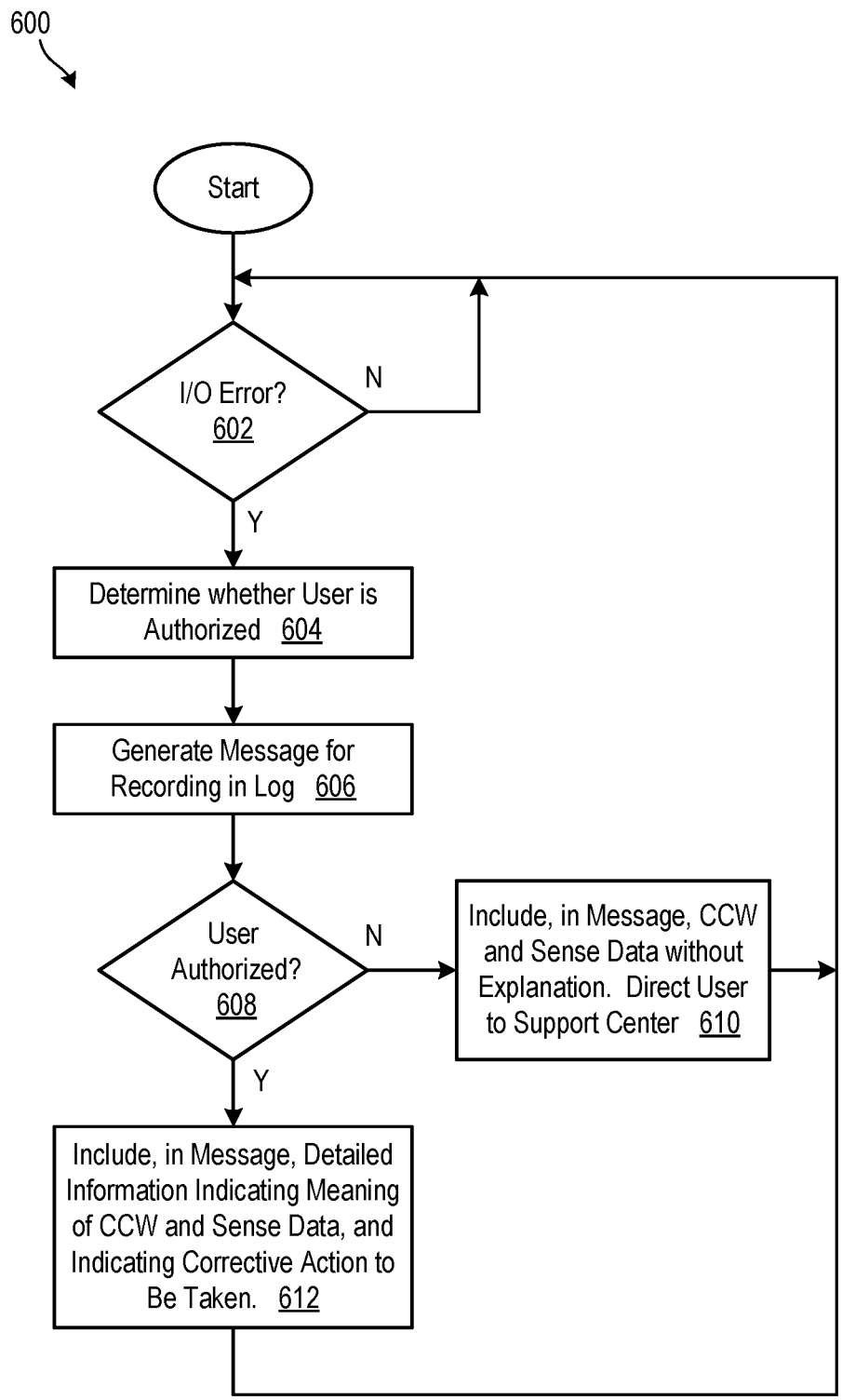
FIG. 6 is a process flow diagram showing a method in accordance with the real-world example and implementation of FIG. 5.

Referring to FIG. 6, a method 600 associated with the real-world application and implementation of FIG. 5 is illustrated. As shown, the method 600 initially determines 602 whether an I/O error has occurred in association with an I/O request issued by the Media Manager component 504. If so, the method 600 determines 604 whether a user is authorized to use the Media Manager component 504. This step 604 may be performed after detecting the I/O error or prior to occurrence of the I/O error.

The method 600 then generates 606 a message to record in the logrec error repository 508 and/or provide to a user externally. If the user is not determined to be authorized at step 608, the method 600 includes 610, in the message, CCW and sense data without further explanation or detail as to what the CCW and sense data mean. By contrast, if the user is determined to be authorized at step 608, the method 600 includes 612, in the message, detailed information indicating the meaning of the CCW and sense data, and indicating corrective action to be taken.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method providing different message information to users based on authorization level, the method comprising:
   upon setting up a product comprising at least one of hardware and software, determining an authorization level of a user intended to use the product, wherein the product has associated therewith different pre-determined content to include in messages based on the authorization level;
   setting an authorization level parameter associated with the product to indicate the authorization level;
   detecting an event in association with the product, wherein the event is one of an error and an abnormal termination;
   in response to detecting the event, automatically performing the following:
      generating a message in association with the event;
      determining the authorization level of the user by reading the authorization level parameter;
      including, in the message, first content from the pre-determined content if the authorization level is at a first level; and
      including, in the message, second content from the pre-determined content if the authorization level is at a second level.

2. The method of claim 1, wherein the second level is higher than the first level.

3. The method of claim 2, wherein the second content is more comprehensive than the first content.

4. The method of claim 3, wherein the second content includes the first content as a subset thereof.

5. The method of claim 1, further comprising enabling a technician to set the authorization level parameter.

6. The method of claim 1, further comprising using a key code to set the authorization level parameter.

7. A computer program product for providing different message information to users based on authorization level, the computer program product comprising a computer-readable storage medium having computer-usable program code embodied therein, the computer-usable program code configured to perform the following when executed by at least one processor:
   upon setting up a product comprising at least one of hardware and software, determine an authorization level of a user intended to use the product, wherein the product has associated therewith different pre-determined content to include in messages based on the authorization level;
   set an authorization level parameter associated with the product to indicate the authorization level;
   detect an event in association with the product, wherein the event is one of an error and an abnormal termination;
   in response to detecting the event, automatically perform the following:
      generate a message in association with the event;
      determine the authorization level of the user by reading the authorization level parameter;
      include, in the message, first content from the pre-determined content if the authorization level is at a first level; and
      include, in the message, second content from the pre-determined content if the authorization level is at a second level.

8. The computer program product of claim 7, wherein the second level is higher than the first level.

9. The computer program product of claim 8, wherein the second content is more comprehensive than the first content.

10. The computer program product of claim 9, wherein the second content includes the first content as a subset thereof.

11. The computer program product of claim 7, wherein the computer-usable program code is further configured to enable a technician to set the authorization level parameter.

12. The computer program product of claim 7, wherein the computer-usable program code is further configured to enable use of a key code to set the authorization level parameter.

13. A system for providing different message information to users based on authorization level, the system comprising:
   at least one processor;
   at least one memory device operably coupled to the at least one processor and storing instructions for execution on the at least one processor, the instructions causing the at least one processor to:
      upon setting up a product comprising at least one of hardware and software, determine an authorization level of a user intended to use the product, wherein the product has associated therewith different pre-determined content to include in messages based on the authorization level;
      set an authorization level parameter associated with the product to indicate the authorization level;
      detect an event in association with the product, wherein the event is one of an error and an abnormal termination;
      in response to detecting the event, automatically perform the following:
         generate a message in association with the event;
         determine the authorization level of the user by reading the authorization level parameter;
         include, in the message, first content from the pre-determined content if the authorization level is at a first level; and
         include, in the message, second content from the pre-determined content if the authorization level is at a second level.

14. The system of claim 13, wherein the second level is higher than the first level.

15. The system of claim 14, wherein the second content is more comprehensive than the first content.

16. The system of claim 15, wherein the second content includes the first content as a subset thereof.

17. The system of claim 13, wherein the instructions further enable use of a key code to set the authorization level parameter.

* * * * *